United States Patent
Manther et al.

(10) Patent No.: US 9,874,115 B2
(45) Date of Patent: *Jan. 23, 2018

(54) MULTI-POSITION CAMSHAFT PHASER WITH TWO ONE-WAY WEDGE CLUTCHES

(71) Applicant: Schaeffler Technologies AG & Co. KG, Herzogenaurach (DE)

(72) Inventors: Debora Manther, Royal Oak, MI (US); Simon Xunnan He, Troy, MI (US)

(73) Assignee: Schaeffler Technologies AG. & Co. KG, Herzogenaurach (DE)

( * ) Notice: Subject to any disclaimer, the term of this patent is extended or adjusted under 35 U.S.C. 154(b) by 256 days.

This patent is subject to a terminal disclaimer.

(21) Appl. No.: 14/701,144

(22) Filed: Apr. 30, 2015

(65) Prior Publication Data

US 2016/0319709 A1    Nov. 3, 2016

(51) Int. Cl.
  *F01L 1/344*  (2006.01)

(52) U.S. Cl.
  CPC ............ *F01L 1/344* (2013.01); *F01L 1/3442* (2013.01); *F01L 1/34409* (2013.01)

(58) Field of Classification Search
  CPC ... F01L 1/34403; F01L 1/34409; F01L 1/344; F01L 2001/3445; F01L 1/325; F01L 2820/031; F01L 1/3442
  USPC .......................................... 123/90.15, 90.17
  See application file for complete search history.

(56) References Cited

U.S. PATENT DOCUMENTS

| | | | |
|---|---|---|---|
| 6,257,186 B1 * | 7/2001 | Heer | F01L 1/024 123/90.17 |
| 7,866,291 B2 | 1/2011 | Young | |
| 9,447,709 B1 * | 9/2016 | Manther | F01L 1/34409 |
| 9,574,466 B2 * | 2/2017 | Manther | F01L 1/34409 |
| 2009/0159390 A1 | 6/2009 | Davis | |
| 2012/0318219 A1 | 12/2012 | Fischer | |
| 2014/0014455 A1 | 1/2014 | Davis | |

FOREIGN PATENT DOCUMENTS

JP        2006312888 A      11/2006

OTHER PUBLICATIONS

International Search Report and Opinion for PCT/US2016/028107; 8 pgs; dated Jul. 26, 2016 by Korean Intellectual Property Office.
U.S. Appl. No. 14/686,478, filed Apr. 14, 2015.

\* cited by examiner

*Primary Examiner* — Mark Laurenzi
*Assistant Examiner* — Paul Thiede (57) ABSTRACT

A camshaft phaser, including: a stator; a rotor including a first channel and a second channel and connectable to a camshaft a first wedge plate and a second wedge plate; and a displacement assembly including a first pin in the first channel and a second pin in the second channel. For an advance mode: fluid displaces the first pin to displace the first wedge plate to enable rotation of the rotor, with respect to the stator, in a first direction; and the second wedge plate blocks rotation of the rotor, with respect to the stator, in a second direction. For a retard mode: fluid displaces the second pin to displace the second wedge plate to enable rotation of the rotor, with respect to the stator, in a second direction; and the first wedge plate blocks rotation of the rotor, with respect to the stator, in the first direction.

19 Claims, 12 Drawing Sheets

MULTI-POSITION CAMSHAFT PHASER WITH TWO ONE-WAY WEDGE CLUTCHES

TECHNICAL FIELD

The present disclosure relates to a multi-position camshaft phaser with two one-way wedge clutches. In particular, the two one-way wedge clutches are used to advance and retard the phase of the rotor with respect to the stator.

BACKGROUND

It is known to use fluid pressure in chambers created by respective portions of a stator and a rotor for a camshaft phaser to maintain and shift a rotational position of the rotor with respect to the stator. This known technique involves complicated hydraulic systems and controls.

SUMMARY

According to aspects illustrated herein, there is provided a camshaft phaser comprising a stator arranged to receive torque from an engine, a rotor arranged to non-rotatably connect to a camshaft, first and second wedge plates radially disposed between the stator and the rotor and, a displacement assembly arranged to for an advance mode, displace the first wedge plate to enable rotation of the rotor, with respect to the stator, in a first circumferential direction, while the second wedge plate blocks rotation of the rotor, with respect to the stator, in a second circumferential direction, opposite the first circumferential direction and, for a retard mode, displace the second wedge plate to enable rotation of the rotor, with respect to the stator, in the second circumferential direction, while the first wedge plate blocks rotation of the rotor, with respect to the stator, in the first circumferential direction.

According to aspects illustrated herein, there is provided a camshaft phaser comprising a stator arranged to receive torque from an engine, a rotor arranged to be non-rotatably connected to a camshaft, first and second wedge plates radially disposed between the rotor and the stator and, a displacement assembly arranged to for an advance mode, displace the first wedge plate in a first circumferential direction to enable rotation of the rotor, with respect to the stator, in the first circumferential direction and, for a retard mode, displace the second wedge plate in a second circumferential direction, opposite the first circumferential direction, to enable rotation of the rotor, with respect to the stator, in the second circumferential direction.

According to aspects illustrated herein, there is provided a method of fabricating a camshaft phaser including: fabricating a stator including a input gear; fabricating a rotor including first and second pluralities of ramps, a central opening through which an axis of rotation for the camshaft phaser passes, first and second chambers, and first and second channels connecting the central opening with the first and second chambers, respectively; installing a first pin in the first chamber; installing a second pin in the second chamber; fabricating a first wedge plate, including a third plurality of ramps and a first circumferentially sloping ramp; fabricating a second wedge plate, including a fourth plurality of ramps and a second circumferentially sloping ramp; installing the first wedge plate radially about the rotor; engaging the first plurality of ramps with the third pluralities of ramps; engaging the first pin with the first circumferentially sloping ramp; installing the second wedge radially about the rotor; engaging the second plurality of ramps with the fourth plurality of ramps; and engaging the second pin with the second circumferentially sloping ramp.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
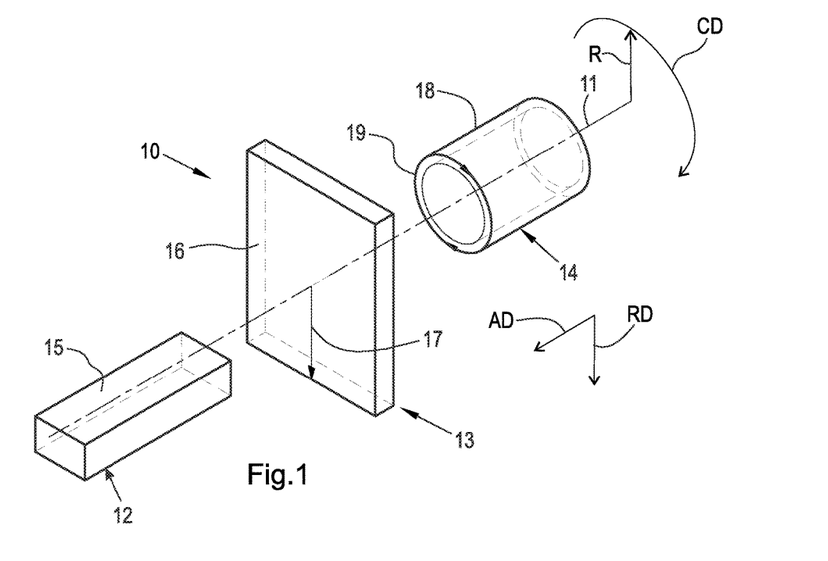
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane parallel to axis 11. Axis 11 is coplanar with planar surface 15; however it is not necessary for an axial surface to be coplanar with axis 11. A radial surface, such as surface 16 of object 13, is formed by a plane orthogonal to axis 11 and coplanar with a radius, for example, radius 17. Surface 18 of object 14 forms a circumferential, or cylindrical, surface. For example, circumference 19 forms a circle on surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively.

Figure 2A:
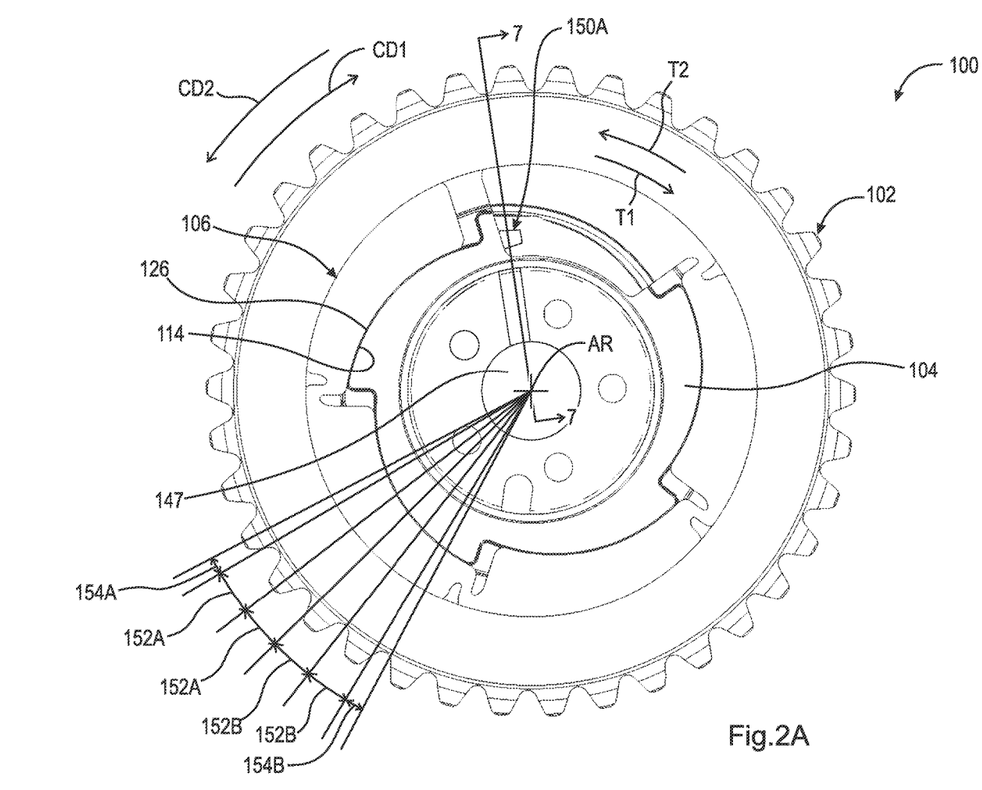
FIG. 2A is a front view of a camshaft phaser with two one-way wedge clutches.

FIG. 2A is a front view of camshaft phaser 100 with two one-way wedge clutches.

Figure 2B:
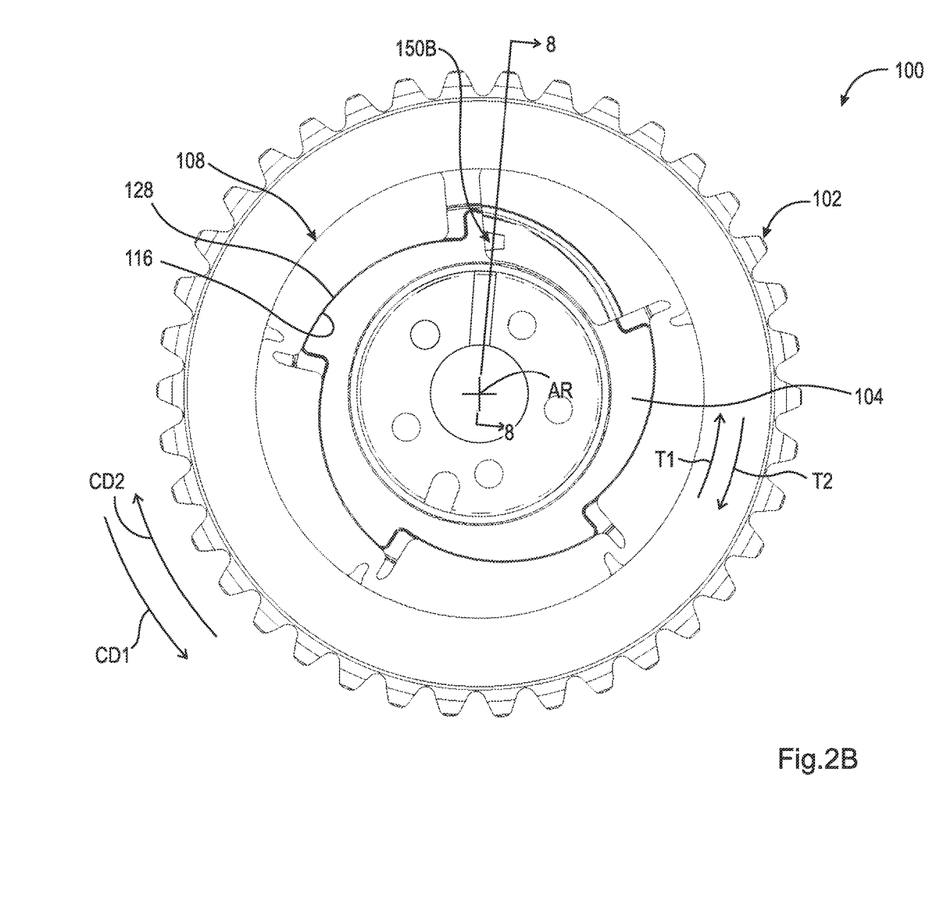
FIG. 2B is a rear view of the camshaft phaser in FIG. 2A.

FIG. 2B is a rear view of camshaft phaser 100 in FIG. 2A.

Figure 3:
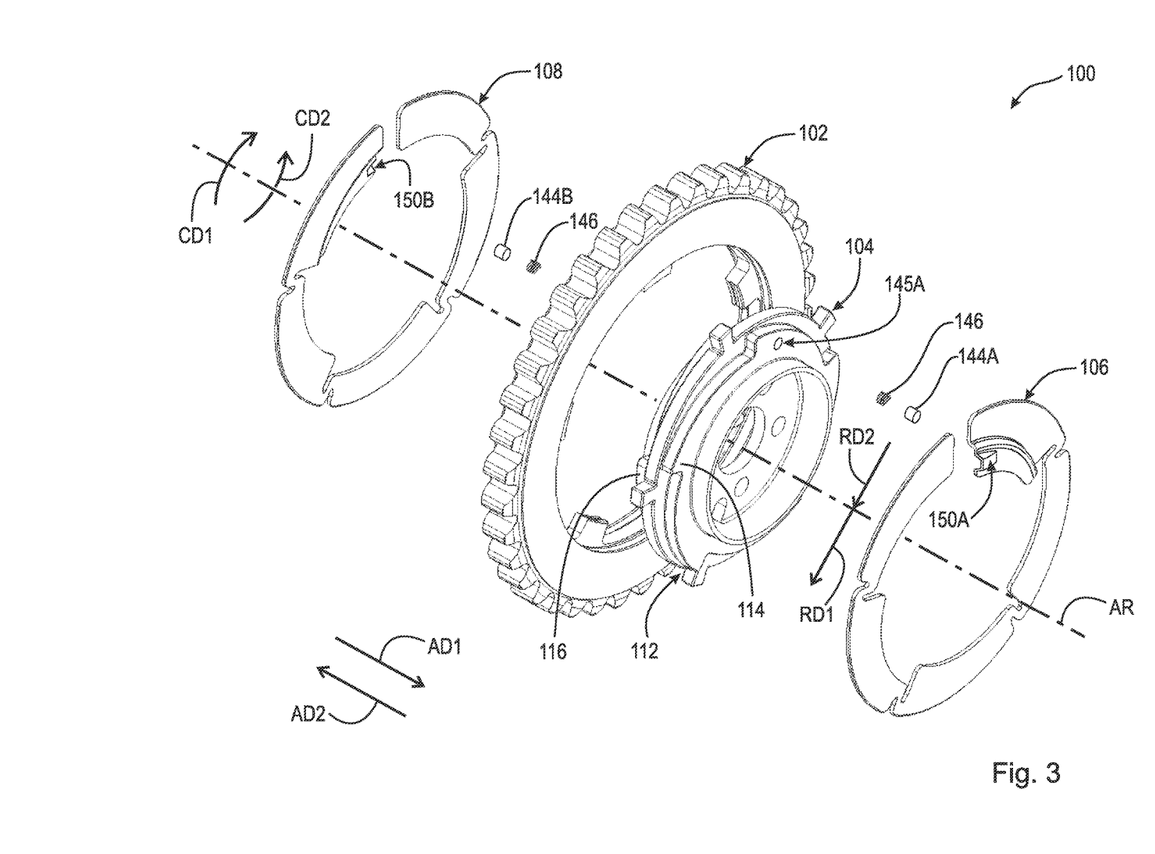
FIG. 3 is a perspective exploded view of the camshaft phaser in FIGS. 2A and 2B.

FIG. 3 is a perspective exploded view of camshaft phaser 100 in FIGS. 2A and 2B.

Figure 4:
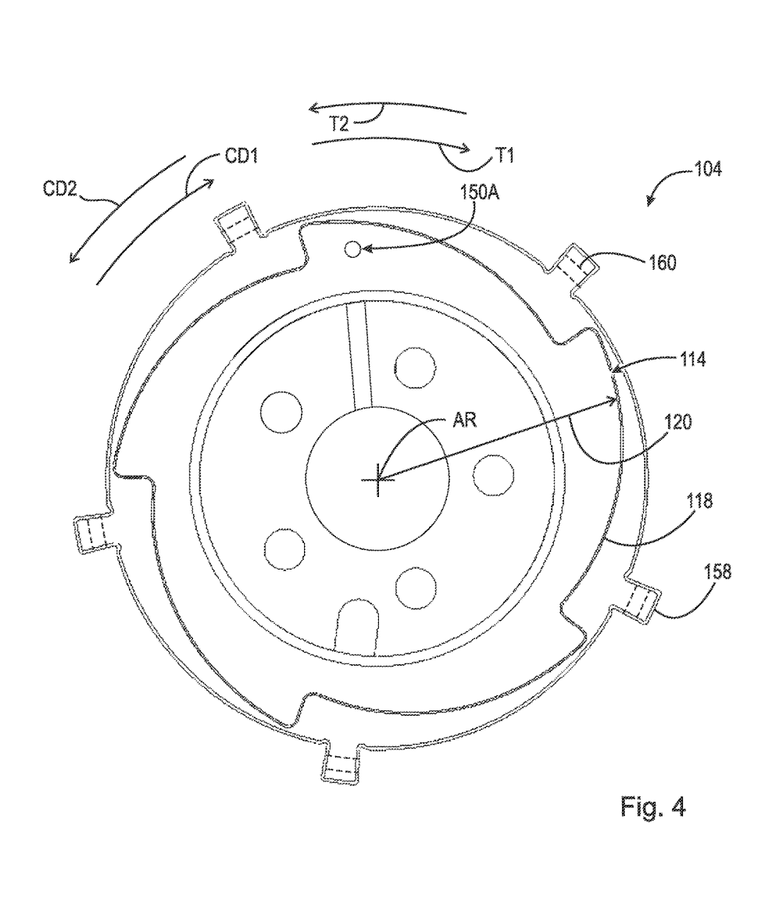
FIG. 4 is a front perspective view of the rotor in FIGS. 2A and 2B.

FIG. 4 is a front perspective view of the rotor in FIGS. 2A and 2B.

Figure 5:
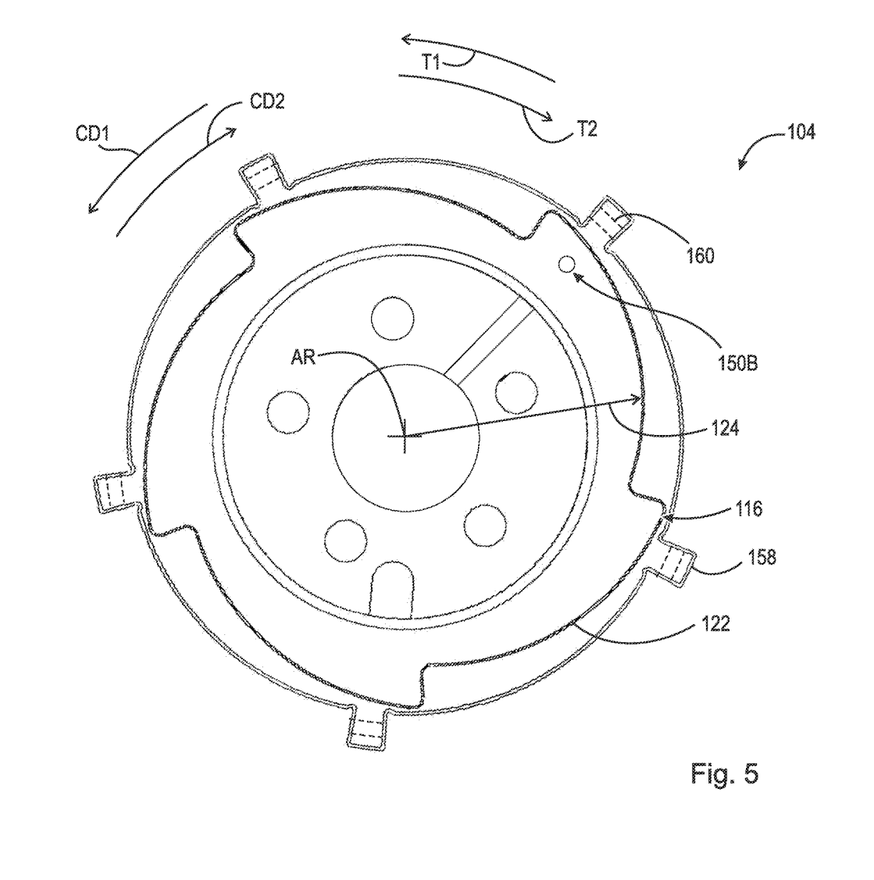
FIG. 5 is a rear perspective view of the rotor in FIGS. 2A and 2B.

FIG. 5 is a rear perspective view of the rotor in FIGS. 2A and 2B. The following should be viewed in light of FIGS. 2 through 5. Phaser 100 includes: axis of rotation AR, rotatable stator 102, rotatable rotor 104, wedge plates 106 and 108, and displacement assembly 110. Stator 102 is arranged to receive torque from an engine as further discussed below. Rotor 104 is arranged to non-rotatably connect to a camshaft as further discussed below. Wedge plates 106 and 108 are frictionally engaged with stator 102.

For an advance mode for phaser 100 (further described below), assembly 110 is arranged to displace wedge plate 106 to enable rotation of rotor 104, with respect to stator 102, in circumferential direction CD1, while wedge plate 108 blocks rotation of rotor 104, with respect to stator 102, in circumferential direction CD2, opposite circumferential direction CD1. For a retard mode for phaser 100 (further discussed below), assembly 110 is arranged to displace wedge plate 108 to enable rotation of rotor 104, with respect to stator 102, in circumferential direction CD2, while wedge plate 108 blocks rotation of rotor 104, with respect to stator 102, in circumferential direction CD1.

For the advance mode, wedge plate 108 is arranged to non-rotatably connect the rotor and the stator to block rotation of the rotor, with respect to the stator, in circumferential direction CD2. For the retard mode, wedge plate 106 is arranged to non-rotatably connect the rotor and the stator to block rotation of the rotor, with respect to the stator, in circumferential direction CD1. In an example embodiment: for the advance mode, assembly 110 is arranged to displace wedge plate 106 in circumferential direction CD1; and for the retard mode, assembly 110 is arranged to displace wedge plate 108 in circumferential direction CD2.

Rotor 104 includes circumferentially disposed ramps 114 and 116. Ramps 114 are separated from ramps 116 in axial direction AD1. Stator 102 is rotatable in circumferential directions CD1 and CD2. Radially outermost surfaces 118 of ramps 114 extend further in radially outer direction RD1 along circumferential direction CD2. That is, radial distance 120 increases along direction CD2. Radially outermost surfaces 122 of ramps 116 extend further in radially outer direction RD1 along circumferential direction CD1. That is, radial distance 124 increases along direction CD1.

Figure 6A:
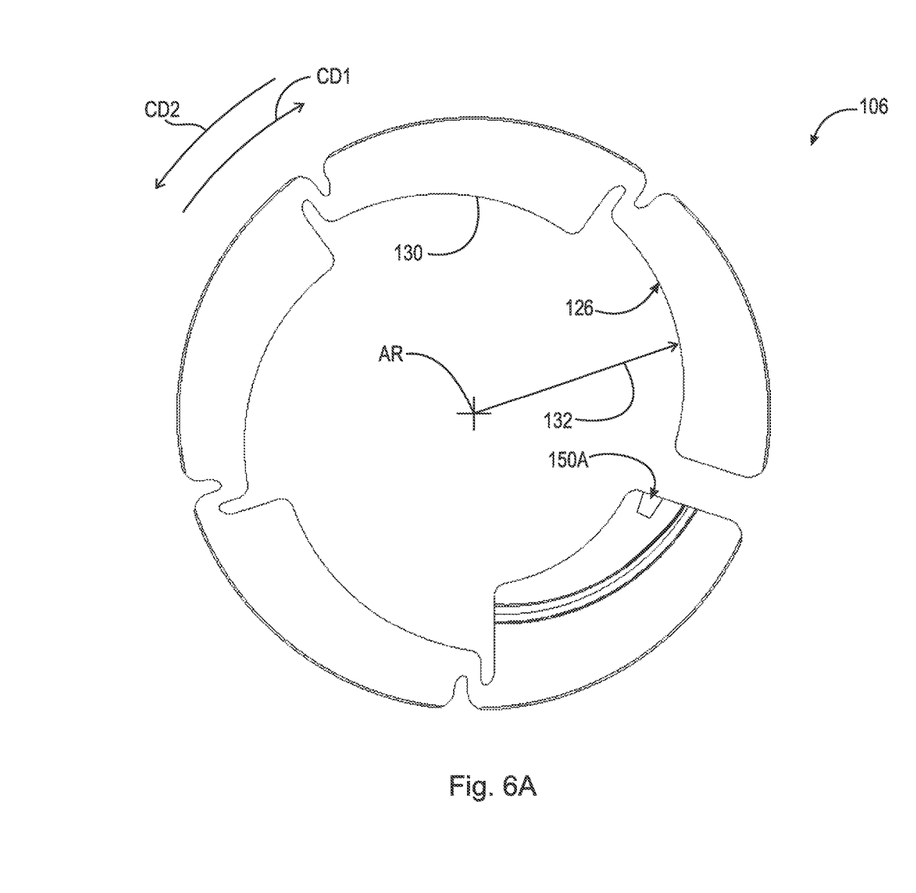
FIG. 6A is a front view of one wedge plate in FIGS. 2A and 2B.

FIG. 6A is a front view of wedge plate 106 in FIGS. 2A and 2B.

Figure 6B:
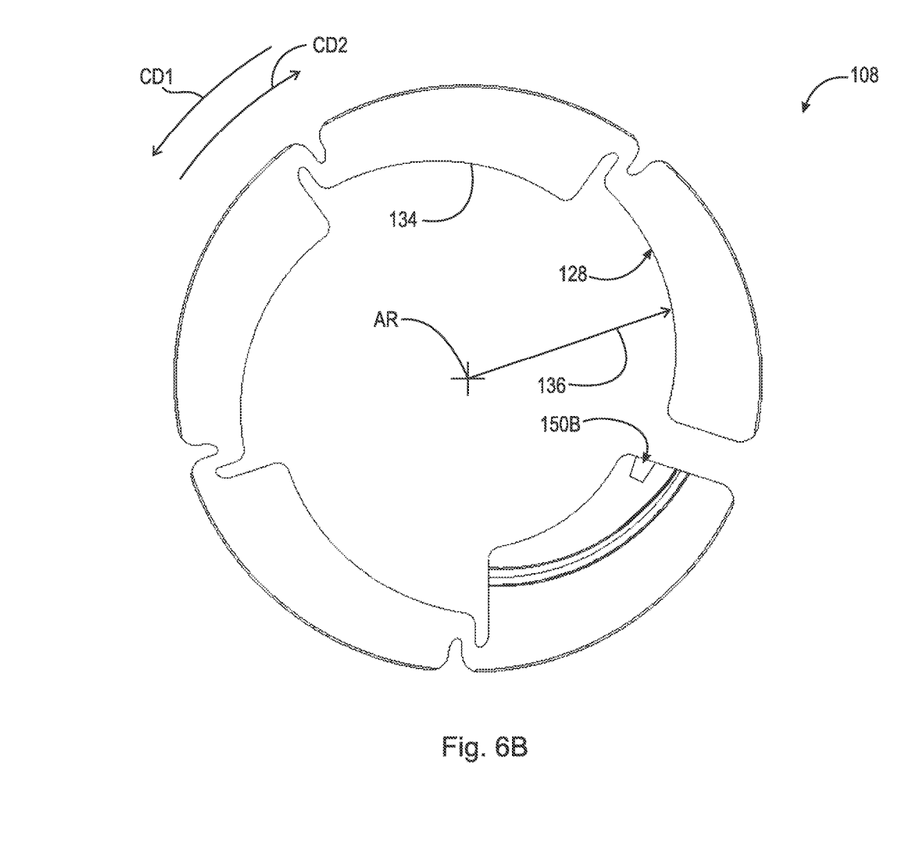
FIG. 6B is a rear view of another wedge plate in FIGS. 2A and 2B.

FIG. 6B is a rear view of wedge plate 108 in FIGS. 2A and 2B. The following should be viewed in light of FIGS. 2 through 6B. Wedge plate 106 includes circumferentially disposed ramps 126 engaged with or engageable with ramps 114. Wedge plate 108 includes circumferentially disposed ramps 128 engaged with or engageable with ramps 116. Radially innermost surface 130 of ramps 126 extend further in radially inner direction RD2 along circumferential direction CD1. That is, radial distance 132 decreases along direction CD1. Radially innermost surface 134 of ramps 128 extend further in direction RD2 along circumferential direction CD2. That is, radial distance 136 decreases along direction CD2.

For the advance mode: the displacement assembly is arranged to slide ramps 126 along ramps 114 in circumferential direction CD1; and ramps 116 are arranged to slide along ramps 128 in circumferential direction CD1. For the retard mode: the displacement assembly is arranged to slide ramps 128 along ramps 116 in circumferential direction CD2; and ramps 114 are arranged to slide along ramps 126 in circumferential direction CD2.

Figure 7:
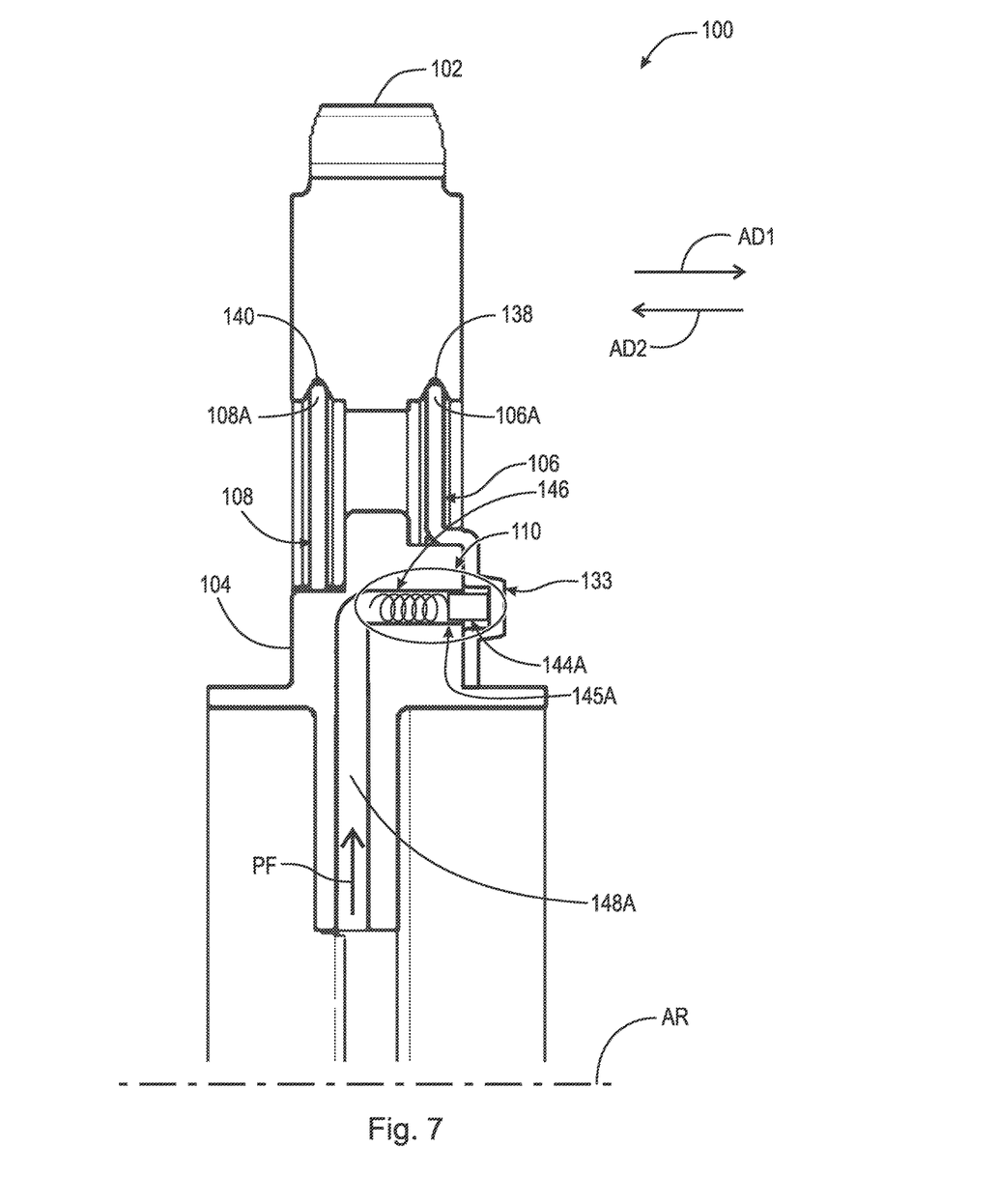
FIG. 7 is a cross-sectional view generally along line 7-7 in FIG. 2A.

FIG. 7 is a cross-sectional view generally along line 7-7 in FIG. 2A.

Figure 8:
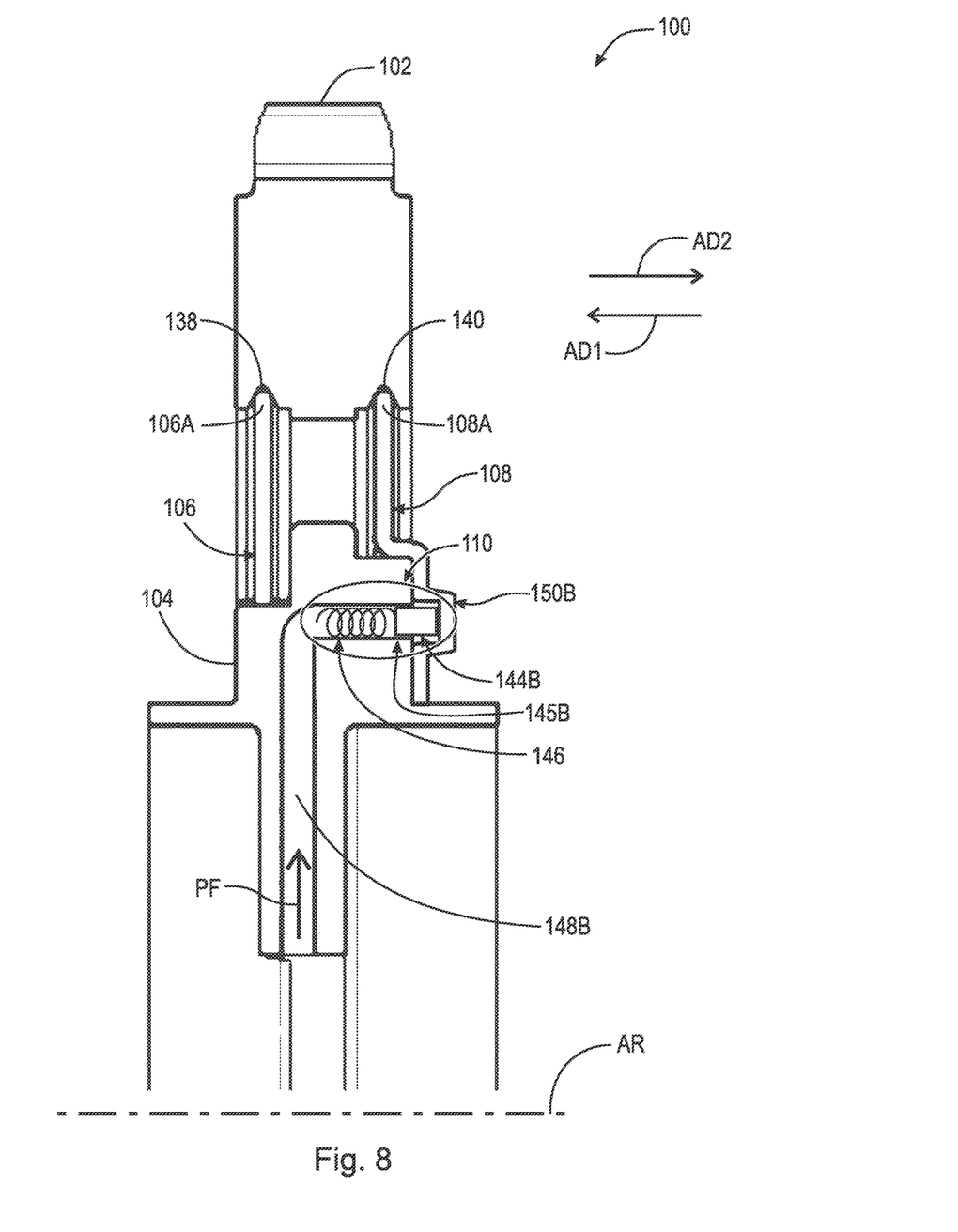
FIG. 8 is a cross-sectional view generally along line 8-8 in FIG. 2B.

FIG. 8 is a cross-sectional view generally along line 8-8 in FIG. 2B. The following should be viewed in light of FIGS. 2 through 8B. As noted above, FIG. 2A is a front view of phaser 100 and FIG. 2B is a back view of phaser 100. That is, FIGS. 2A and 2B view phaser 100 from opposite sides. Thus, axial direction AD1 in FIG. 7 is left to right and axial direction AD1 in FIG. 8 is right to left. In an example embodiment, stator 102 includes circumferentially disposed grooves 138 and 140 and wedge plates 106 and 108 include chamfered radially outer portions 106A and 108A. Portions 106A and 108A are frictionally engaged with grooves 138 and 140 so that wedge plates 106 and 108 rotate with stator 102 except as noted above and below. As wedge plate 106 is displaced radially outward as described above, portion 106A compressively engages groove 138, non-rotatably connecting stator 102 and wedge plate 106A. As wedge plate 108 is displaced radially outward as described above, portion 108A compressively engages groove 140, non-rotatably connecting stator 102 and wedge plate 108.

In an example embodiment, assembly 110 includes locking pin 144A and 144B at least partially disposed in chamber 145A and 145B, respectively, in rotor 104. Pins 144A and 144B are engaged with the wedge plates 106 and 108, respectively. For the advance mode, the displacement assembly is arranged to displace pin 144A in axial direction AD1 to displace wedge plate 106 in circumferential direction CD1. For the retard mode, the displacement assembly is arranged to displace pin 144B in axial direction AD2, opposite axial direction AD1, to displace wedge plate 108 in circumferential direction CD2. In an example embodiment, assembly 110 includes springs 146 urging pins 144A and 144B into contact with wedge plates 106 and 108, respectively. Thus, springs 146 maintain contact between pins 144A and 144B and plates 106 and 108, respectively, in the absence of the pressurized fluid described below.

In an example embodiment, the rotor includes central opening 147 through which axis of rotation AR passes. Displacement assembly 110 includes channels 148A and 148B connecting the central opening and chambers 145A and 145B, respectively. Channel 148A is arranged to receive pressurized fluid PF to displace pin 144A in axial direction AD1. Channel 148B is arranged to receive pressurized fluid PF to displace pin 144B in direction AD2.

In an example embodiment, wedge plates 106 and 108 includes circumferentially sloping ramps 150A and 150B, respectively. Ramp 150A extends further axial direction AD1 along circumferential direction CD2 and ramp 150B extends further in axial direction AD2 along circumferential direction CD1. Pin 144A is arranged to displace in axial direction AD1 to contact ramp 150A. Wedge plate 106 is arranged to slide along pin 150A in circumferential direction CD1. That is, to relieve the axial pressure applied by pin 150A on wedge plate 106, ramp 150A slides on pin 144A in direction CD1. Pin 144B is arranged to displace in axial direction AD2 to contact ramp 150B. Wedge plate 108 is arranged to slide along pin 150B in circumferential direction CD2. That is, to relieve the axial pressure applied by pin 150B on wedge plate 108, ramp 150B slides on pin 144B in direction CD2.

As further described below, in a drive mode, wedge plates 106 and 108 operate without interference from pins 150A and 150B, respectively. That is, pressurized fluid is not present in channels 145A and 145B. For example: for rotation of rotor 104, with respect to stator 102 and wedge plate 106, in direction CD1, ramps 114 slide up ramps 126 to displace wedge plate 106 radially outward to compressively engage and non-rotatably connect the rotor, wedge plate 106, and the stator; and, for rotation of rotor 104, with respect to stator 102 and wedge plate 108, in direction CD2, ramps 116 slide up ramps 128 to displace wedge plate 108 radially outward to compressively engage and non-rotatably connect rotor 104, wedge plate 108, and stator 102.

As further described below, in the drive mode: for rotation of rotor 104, with respect to wedge plate 106, in direction CD1, ramps 114 are pushed down ramps 126 to enable rotation of the rotor, with respect to the stator, in direction CD1; and, for rotation of rotor 104, with respect to wedge plate 106, in direction CD2, ramps 116 are pushed down ramps 128 to enable rotation of the rotor, with respect to the stator, in direction CD2. As noted below, the amount of rotation of rotor 104, with respect to stator 102 and wedge plates 106 and 108 in the drive mode is nominal.

Figure 9:
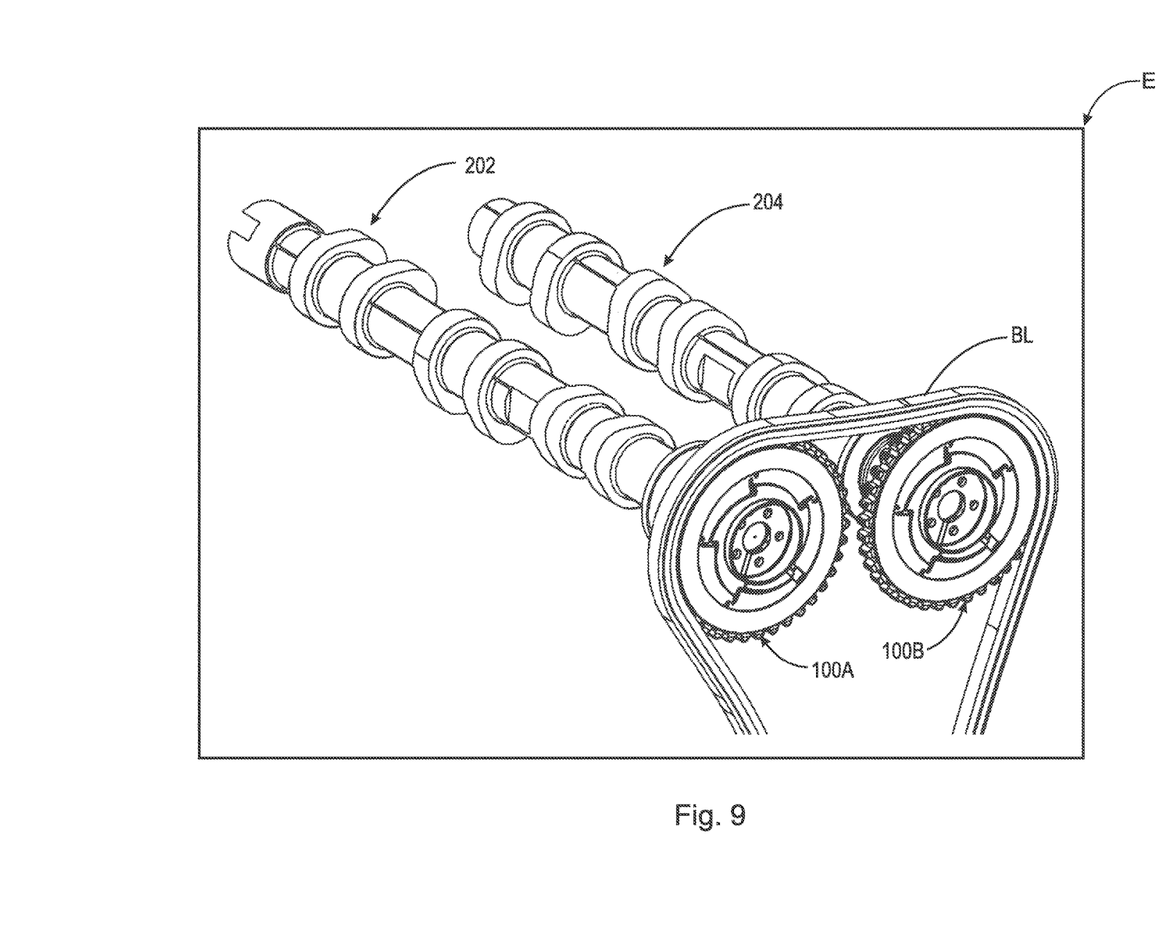
FIG. 9 is a perspective view of two camshaft phasers, as shown in FIGS. 2A and 2B, connected to respective cam shafts.

FIG. 9 is a perspective view of camshaft phasers 100A and 100B connected to cam shafts 202 and 204, respectively. The discussion regarding phaser 100 is applicable to phasers 100A and 100B. Typically, one of cam shafts 202 and 204 is for an intake valve train and the other of cam shafts 202 and 204 is for an exhaust valve train. Phasers 100A and 100B are rotated by chain (simplified chain model—chain sprockets are shown) BL, typically driven by a crankshaft for an engine of which the camshafts and phasers are a part. The following discussion is applicable to both phaser 100A and phaser 100B; however phaser 100A is referenced in the discussion that follows.

In the discussion that follows, stator 102 rotates in direction CD1 in response to torque from chain BL. As is known in the art, torsional forces T1 and T2 are transmitted from camshaft 202, in directions CD1 and CD2, respectively, to rotor 104 during operation of phaser 100. The torsional force forces are due to interaction of cam lobes (not shown) on camshaft 202 with various components of a valve train (not shown) of which camshaft 202 is a part. Torsional forces T1 and T2 are transmitted in a repeating cycle. Rotor 104 rotates in direction CD1; however, torsional force T1 urges rotor 104 in direction CD1 with respect to the stator and torsional force T2 urges rotor 104 in direction CD2 with respect to the stator.

Phaser 100A is configured to operate in at least three modes: the drive mode; an advance mode; and a retard mode. In the drive mode, the stator receives rotational torque from chain or belt BL, for example in direction CD1. Wedge plates 106 and 108 are frictionally engaged with stator 102 and this engagement urges wedge plates 106 and 108 in direction CD1 (in this example). The operation in drive mode can be divided into first and second phases, associated with torques T1 and T2, respectively. In the first phase, due to torque T1, rotor 104 is urged in direction CD1 with respect to stator 102, causing ramps 114 to slide up ramps 126, non-rotatably connecting the rotor and the stator via wedge plate 106. In the second phase, due to torque T2, rotor 104 is urged in direction CD2 with respect to stator 102, causing ramps 116 to slide up ramps 128, non-rotatably connecting the rotor and the stator via wedge plate 108. The configuration of rotor 104 and wedge plates 106 and 108 is determined so that only nominal rotation of rotor 104 with respect to the stator is required to transition between the first and second phases.

Thus, the rotor remains non-rotatably connected to the stator throughout the drive mode, with the exception of the brief transition between the first and second phases, and the rotational position of the rotor with respect to the stator does not vary except for a nominal amount during the transition between the first and second phases, providing a smooth and continuous transfer of rotation from stator 102 to rotor 104 during the drive mode.

The following describes the advance mode. Assume stator 102 is rotating in direction CD1 and phaser 100A receives torsional force T1. Fluid PF in channel 145A urges pin 144A in direction AD1. As described above, wedge plate 106 slides on pin 144A, ramps 126 slide down ramps 114, and rotor 104 displaces distance 152A in direction CD1. At the same time, the rotation of rotor 104 causes ramps 116 to slide down ramps 128, that is, wedge plate 108 does not block the rotation of the rotor.

The rotor then receives torque T2 to initiate the second phase and the pressurized fluid is drained from channel 145A. In response to torque T2, wedge plate 108 is urged in direction CD2 and ramps 128 slide up ramps 116 to non-rotatably connect the rotor and the stator. Thus, rotor 104 is prevented from rotating back in direction CD2, which would cancel the displacement in distance 152A. Therefore, in the advance mode, for each cycle of torques T1 and T2, rotor 104 rotates distance 152A in direction CD1. For successive cycles of T1 and T2 in the advance mode, rotor 104 displaces distance 152A, with respect to stator 102, in direction CD1. That is, this process is repeatable via successive cycles of torsional forces T1 and T2 to attain a desired shift of rotor 104.

The following describes the retard mode. Assume stator 102 is rotating in direction CD1 and phaser 100 receives torsional force T2. Fluid PF in channel 145B urges pin 144B in direction AD2. As described above, wedge plate 108 slides on pin 144B, ramps 128 slide down ramps 116, and rotor 104 displaces distance 152B in direction CD2. At the same time, the rotation of rotor 104 causes ramps 114 to slide down ramps 126, that is, wedge plate 106 does not block the rotation of the rotor.

The rotor then receives torque T1 and the pressurized fluid is drained from channel 145B. In response to torque T1, wedge plate 106 is urged in direction CD1 and ramps 126 slide up ramps 114 to non-rotatably connect the rotor and the stator. Thus, rotor 104 is prevented from rotating back in direction CD1, which would cancel the displacement in distance 152B. Therefore, in the retard mode, for each cycle of torques T1 and T2, rotor 104 rotates distance 152B in direction CD2. For successive cycles of T1 and T2 in the retard mode, rotor 104 displaces distance 152B, with respect to stator 102, in direction CD2. That is, this process is repeatable via successive cycles of the first and second drive mode phases and torsional force forces T1 and T2 to attain a desired shift of rotor 104.

Each distance 152A is a result of phaser 100A implementing a full cycle of torsional force forces T1 and T2. To shift rotor 104 in direction CD1 by distance 154A, less than distance 152A, pressurized fluid PF is drained from channel 145A after rotor 104 has begun rotation in direction CD1 (by distance 154A) but before rotor 104 has rotated distance 152A.

Each distance 152B is a result of phaser 100A implementing a full cycle of torsional force forces T1 and T2. To shift rotor 104 in direction CD2 by distance 154B, less than distance 152B, pressurized fluid PF is drained from channel 145B after rotor 104 has begun rotation in direction CD2 (by distance 154B), but before rotor 104 has rotated distance 152B.

Thus, rotor 104 can be controllably and repeatably rotated virtually any amount with respect to stator 102 in the advance and retard modes.

To prevent loss of rotational engagement between rotor 104 and stator 102, and torque transmission from stator 102 to rotor 104, locking pin 144A and 144B are not simultaneously displaced in axial direction AD1 and AD2, respectively.

Figure 10:
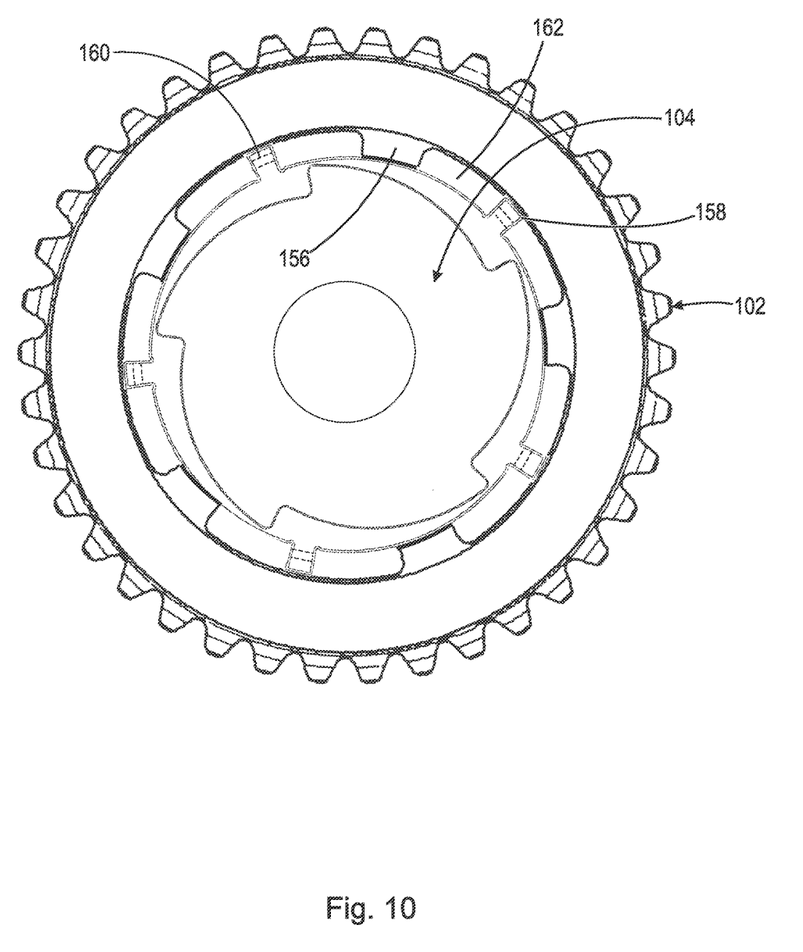
FIG. 10 is a front view of a stator for the camshaft phaser in FIGS. 2A and 2B.

FIG. 10 is a front view of stator 102 for camshaft phaser 100 in FIGS. 2A and 2B. In an example embodiment, stator 102 includes at least one radially inwardly projecting protrusion 156 and rotor 104 includes at least one radially outwardly projecting protrusions 158. Protrusion(s) 158 are configured to contact protrusion(s) 156 to limit a degree to which the rotational position of rotor 104 can be shifted with respect to stator 102. In an example embodiment, rotor 104 includes channels 160. Each channel 160 passes through a respective protrusion 158. Channels 160 provide respective flow paths between chambers 162 partially formed by protrusions 156 and 158 and filled with fluid. For example, as rotor 104 rotates with respect to stator 102, protrusions 158 displace within chambers 162 compressing fluid in chamber 162. Channels 160 provide flow paths through which the compressed fluid can flow, providing dampening.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A camshaft phaser, comprising:
a stator arranged to receive torque from an engine;
a rotor including a first channel and a second channel, and arranged to non-rotatably connect to a camshaft;
a first wedge plate and a second wedge plate each radially disposed between the stator and the rotor; and,
a displacement assembly including:
a first pin at least partially disposed in the first channel; and,
a second pin at least partially disposed in the second channel, wherein:
for an advance mode for the camshaft phaser:
the first pin is displaced, in a first axial direction, by first pressurized fluid in the first channel; and,
the first pin displaces the first wedge plate to enable rotation of the rotor, with respect to the stator, in a first circumferential direction, while the second wedge plate blocks rotation of the rotor, with respect to the stator, in a second circumferential direction, opposite the first circumferential direction, and,
for a retard mode for the camshaft phaser:
the second pin is displaced, in a second axial direction opposite the first axial direction, by second pressurized fluid in the second channel; and,
the second pin displaces the second wedge plate to enable rotation of the rotor, with respect to the stator, in the second circumferential direction, while the first wedge plate blocks rotation of the rotor, with respect to the stator, in the first circumferential direction.

2. The camshaft phaser of claim 1, wherein:
the rotor is arranged to receive a plurality of torque cycles from the camshaft;
each torque cycle included in the plurality of torque cycles includes a first torque in the first circumferential direction followed by a second torque in the second circumferential direction;
in the advance mode, for a first torque cycle included in the plurality of torque cycles:
the stator is arranged to rotate in the first circumferential direction;
the rotor is arranged to receive the first and second torques;
the first pin is arranged to displace the first wedge plate to enable rotation of the rotor, with respect to the stator, a first distance in the first circumferential direction; and,
the second wedge plate is arranged to block rotation of the rotor, with respect to the stator, in the second circumferential direction; and,
in the retard mode, for a second torque cycle included in the plurality of torque cycles:
the stator is arranged to rotate in the first circumferential direction;
the rotor is arranged to receive the first and second torques;
the second pin is arranged to displace the second wedge plate to enable rotation of the rotor, with respect to the stator, a second distance in the second circumferential direction; and,
the first wedge plate is arranged to block rotation of the rotor, with respect to the stator, in the first circumferential direction.

3. The camshaft phaser of claim 2, wherein:
in the advance mode, for a third torque cycle included in the plurality of torque cycles, the first pin is arranged to enable displacement of the first wedge plate in the second circumferential direction to block rotation of the rotor, with respect to the stator in the first circumferential direction after the rotor has begun rotating in the first circumferential direction and before the rotor has rotated the first distance in the first circumferential direction; or,
in the retard mode, for a transition from a third torque cycle included in the plurality of torque cycles to a fourth torque cycle included in the plurality of torque cycles, the second pin is arranged to enable displacement of the second wedge plate in the first rotational direction to block rotation of the rotor, with respect to the stator in the second circumferential direction after the rotor has begun rotating in the second circumferential direction and before the rotor has rotated the second distance in the second circumferential direction.

4. The camshaft phaser of claim 1, wherein:
the rotor includes a first plurality of ramps and a second plurality of ramps, respectively;
the first wedge plate and the second wedge plate include a third plurality of ramps and a fourth plurality of ramps, respectively, engaged with the first plurality of ramps and the second plurality of ramps, respectively;
for the advance mode:
the first pin is arranged to slide the third plurality of ramps along the first plurality of ramps in the first circumferential direction; and,
the second plurality of ramps is arranged to slide along the fourth plurality of ramps in the first circumferential direction; and,
for the retard mode:
the second pin is arranged to slide the fourth plurality of ramps along the second plurality of ramps in the second circumferential direction; and,
the first plurality of ramps is arranged to slide along the third plurality of ramps in the second circumferential direction.

5. The camshaft phaser of claim 1, wherein for a drive mode for the camshaft phaser:
when the camshaft rotates the rotor, in the first circumferential direction with respect to the stator, the first plurality of ramps is arranged to slide along the third plurality of ramps in the first circumferential direction to non-rotatably connect the rotor, the first wedge plate and the stator; and,
when the camshaft rotates the rotor, in the second circumferential direction with respect to the stator, the second plurality of ramps is arranged to slide along the fourth plurality of ramps in the second circumferential direction to non-rotatably connect the rotor, the second wedge plate, and the stator.

6. A camshaft phaser, comprising:
a stator arranged to receive torque from an engine;
a rotor including a first channel and a second channel, and arranged to be non-rotatably connected to a camshaft;
a first wedge plate and a second wedge plate each radially disposed between the rotor and the stator; and,
a displacement assembly including:
a first pin at least partially disposed in the first channel; and,
a second pin at least partially disposed in the second channel, wherein:
for an advance mode for the camshaft phaser, the first pin is arranged to displace the first wedge plate in a first circumferential direction to enable rotation of the rotor, with respect to the stator, in the first circumferential direction; and,
for a retard mode for the camshaft phaser, the second pin is arranged to displace the second wedge plate in a second circumferential direction, opposite the first circumferential direction, to enable rotation of the rotor, with respect to the stator, in the second circumferential direction.

7. The camshaft phaser of claim 6, wherein:
for the advance mode, the second wedge plate is arranged to non-rotatably connect the rotor and the stator to block rotation of the rotor, with respect to the stator, in the second circumferential direction; and,
for the retard mode, the second wedge plate is arranged to non-rotatably connect the rotor and the stator to block rotation of the rotor, with respect to the stator, in the first circumferential direction.

8. The camshaft assembly of claim 6, wherein:
the stator includes a radially inner surface with first and second circumferentially extending grooves;
a radially outermost portion of the first wedge plate is disposed in the first circumferentially extending groove; and,
a radially outermost portion of the second wedge plate is disposed in the second circumferentially extending groove.

9. The camshaft phaser of claim 6, wherein:
the rotor includes a first plurality of ramps and a second plurality of ramps;
the first wedge plate includes a third plurality of ramps engaged with the first plurality of ramps;
the second wedge plate includes a fourth plurality or ramps engaged with the second plurality of ramps;
for the advance mode, the first pin is arranged to slide the first plurality of ramps along the third plurality of ramps in the first circumferential direction; and,
for the retard mode, the second pin is arranged to slide the second plurality of ramps along the fourth plurality of ramps in the second circumferential direction.

10. The camshaft phaser of claim 6, wherein:
the rotor includes first and second chambers;
the first pin and the second pin:
are at least partially disposed in the first chamber and in the second chamber, respectively; and,
are engaged with the first wedge plate and with the second wedge plate, respectively;
for the advance mode, first pressurized fluid is arranged to displace the first pin in a first axial direction to displace the first wedge plate in the first circumferential direction; and,
for the retard mode, second pressurized fluid is arranged to displace the second pin in a second axial direction, opposite the first axial direction, to displace the second wedge plate in the second circumferential direction.

11. The camshaft phaser of claim 10, wherein:
the rotor includes a central opening through which an axis of rotation for the camshaft phaser passes;
the first channel:
connects the central opening and the first chamber; and,
is arranged to receive the first pressurized fluid to displace the first pin in the first axial direction; and,
the second channel:
connects the central opening and the second chamber; and,
is arranged to receive the second pressurized fluid to displace the second pin in the second axial direction.

12. The camshaft phaser of claim 10, wherein:
the first wedge plate includes a first ramp;
the second wedge plate includes a second ramp;
for the advance mode for the camshaft phaser, the first pressurized fluid in the first channel displaces the first pin in the first axial direction to contact the first ramp; and,
for the retard mode for the camshaft phaser, the second pressurized fluid in the second channel displaces the second pin in the second axial direction to contact the second ramp.

13. The camshaft phaser of claim 6, wherein:
the first wedge plate is arranged to slide along the first pin in the first circumferential direction; and, the second wedge plate is arranged to slide along the second pin in the second circumferential direction.

14. The camshaft phaser of claim 6, wherein:
the rotor is arranged to receive a plurality of torque cycles from the camshaft;
each torque cycle included in the plurality of torque cycles includes a first torque in the first circumferential direction followed by a second torque in the second circumferential direction;
in the advance mode, for a first torque cycle included in the plurality of torque cycles:
the stator is arranged to rotate in the first circumferential direction;
the rotor is arranged to receive the first and second torques;
the rotor is arranged to rotate, with respect to the stator, a first distance in the first circumferential direction; and,
the second wedge plate is arranged to block rotation of the rotor, with respect to the stator, in the second circumferential direction; and,
in the retard mode, for a second torque cycle included in the plurality of torque cycles:
the stator is arranged to rotate in the first circumferential direction;
the rotor is arranged to receive the first and second torques;
the rotor is arranged to rotate, with respect to the stator, a second distance in the second circumferential direction; and,
the first wedge plate is arranged to block rotation of the rotor, with respect to the stator, in the first circumferential direction.

15. The camshaft phaser of claim 14, wherein:
in the advance mode, for a third torque cycle included in the plurality of torque cycles, the first pin is arranged to displace radially inward so that the first wedge plate blocks rotation of the rotor, with respect to the stator in the first circumferential direction, after the rotor has begun rotating in the first circumferential direction before the rotor has rotated the first distance in the first circumferential direction; or,
in the retard mode, for a transition from a third torque cycle included in the plurality of torque cycles to a fourth torque cycle included in the plurality of torque cycles, the second pin is arranged to displace radially inward so that the second wedge plate blocks rotation of the rotor, with respect to the stator in the second circumferential direction, after the rotor has begun rotating in the second circumferential direction before the rotor has rotated the second distance in the second circumferential direction.

16. The camshaft assembly of claim 14, wherein for each torque cycle in the plurality of torque cycles and while the camshaft phaser is in the advance mode, the rotational position of the rotor with respect to the stator is shifted further in the first direction by the first circumferential distance with respect to the stator.

17. The camshaft assembly of claim 14, wherein for each torque cycle in the plurality of torque cycles and while the camshaft phaser is in the retard mode, the rotational position of the rotor with respect to the stator is shifted further in the second direction by the second circumferential distance with respect to the stator.

18. A method of fabricating a camshaft phaser, comprising:
fabricating a stator including a input gear;
fabricating a rotor including:
a first plurality of ramps;
a second plurality of ramps;
a central opening through which an axis of rotation for the camshaft phaser passes;
a first chamber bounded by the rotor;
a second chamber bounded by the rotor;
a first channel connecting the central opening with the first chamber;
a second channel connecting the central opening with the second chamber;
receiving a first pin in the first chamber;
receiving a second pin in the second chamber;
fabricating a first wedge plate, including:
a third plurality of ramps; and,
a first circumferentially sloping ramp;
fabricating a second wedge plate, including:
a fourth plurality of ramps; and,
a second circumferentially sloping ramp;
installing the first wedge plate radially about the rotor;
engaging the first plurality of ramps with the third pluralities of ramps;
engaging the first pin with the first circumferentially sloping ramp;
installing the second wedge plate radially about the rotor;
engaging the second plurality of ramps with the fourth plurality of ramps; and,
engaging the second pin with the second circumferentially sloping ramp.

19. The method of claim 18, wherein:
installing the first wedge plate radially about the rotor includes
installing the first wedge plate such that the first plurality of ramps slopes radially outward and in the first circumferential direction; and,
urging the first wedge plate radially outward against the stator; and,
installing the second wedge plate radially about the rotor includes:
installing the second wedge plate such that the second plurality of ramps slopes radially outward and in the second circumferential direction; and,
urging the second wedge plate radially outward against the stator.

* * * * *